United States Patent [19]

Coissard

[11] Patent Number: 5,809,630
[45] Date of Patent: Sep. 22, 1998

[54] METHOD OF MANUFACTURING A CULINARY VESSEL WITH REINFORCED BOTTOM

[75] Inventor: Georges Coissard, Rumilly, France

[73] Assignee: Seb S.A., Ecully, France

[21] Appl. No.: 902,036

[22] Filed: Jul. 29, 1997

Related U.S. Application Data

[62] Division of Ser. No. 389,183, Feb. 15, 1995, abandoned.

[30] Foreign Application Priority Data

Feb. 15, 1994 [FR] France ................................. 9401711

[51] Int. Cl.⁶ .................................................. B21D 39/00
[52] U.S. Cl. ........................... 29/505; 220/608; 220/912; 126/390; 99/422
[58] Field of Search ..................... 29/505, 521, DIG. 37; 220/912, 608; 72/414; 126/390; 99/422

[56] References Cited

U.S. PATENT DOCUMENTS

| | | | |
|---|---|---|---|
| 3,593,702 | 7/1971 | Zigomalas | 126/390 |
| 3,628,243 | 12/1971 | Phol | 72/414 |
| 4,544,818 | 10/1985 | Minamida | 126/390 |
| 4,926,843 | 5/1990 | Vocke et al. | 126/390 |
| 5,396,834 | 3/1995 | Gambini | 126/390 |
| 5,497,696 | 3/1996 | Coudurier | 220/912 |
| 5,564,590 | 10/1996 | Kim | 220/912 |

FOREIGN PATENT DOCUMENTS

| | | | |
|---|---|---|---|
| 0 509 860 | 10/1992 | European Pat. Off. . | |
| 568322 | 11/1993 | European Pat. Off. | 220/912 |
| 0 613 647 | 9/1994 | European Pat. Off. . | |
| 2643806 | 9/1990 | France | 220/608 |
| 132266 | 6/1929 | Switzerland . | |
| WO 87/04911 | 8/1987 | WIPO . | |

*Primary Examiner*—David P. Bryant
*Attorney, Agent, or Firm*—Young & Thompson

[57] ABSTRACT

A culinary vessel is made from two sheets of different metals or alloys laminated together and stamped to form a vessel having a bottom and a side wall. The bottom incorporates small stamped cavities such that the cavities formed in the outer sheet enter complementary cavities formed in the inner sheet. This strengthens the bond between the two sheets.

8 Claims, 1 Drawing Sheet

METHOD OF MANUFACTURING A CULINARY VESSEL WITH REINFORCED BOTTOM

This application is a division of application Ser. No. 08/389,183, filed Feb. 15, 1995 abandoned.

BACKGROUND OF THE INVENTION

1. Field of the Invention

The present invention concerns a culinary vessel made from two sheets of different metals or alloys laminated together and pressed to form a vessel having a bottom and a side wall.

The invention also concerns the method of manufacturing a vessel of this kind.

2. Description of the Prior Art

The inner sheet is usually a sheet of aluminum and the outer sheet is usually a sheet of stainless steel.

The fact that the aluminum sheet is covered on the outside with a stainless steel sheet has many advantages, including improved appearance and easier cleaning.

However, given the different coefficients of thermal expansion of the two sheets, the lamination between them in the bottom of the item can deteriorate in time due in particular to the high levels of mechanical and thermal stresses to which cooking utensils are exposed.

An object of the present invention is to overcome this problem.

SUMMARY OF THE INVENTION

Accordingly, the invention is directed to a culinary vessel made from two sheets of different metals or alloys laminated together and pressed to form a vessel having a bottom and a side wall.

In accordance with the invention, in this culinary vessel said bottom has a series of small cavities pressed into it so that the cavities formed in the outer sheet enter complementary cavities formed in the inner sheet.

The pressing is performed by cold stamping.

This produces a mechanical bond between the two laminated sheets by interpenetration of complementary stamped cavities which strengthen not only the bond between the two sheets but also the resistance of the vessel to deformation due to the effect of repetitive heating and cooling.

The invention is also directed to a method of manufacturing the aforementioned vessel in which a disk of two sheets of different metals or alloys laminated together is pressed.

In accordance with the invention, in this method the disk is cold stamped in the area which constitutes the outside of the bottom of the finished vessel to form small cavities which are sufficiently deep to create complementary cavities in the inner sheet in which engage the protuberances stamped into the outer sheet, following which the disk is pressed to form the vessel.

Other features and advantages of the invention will emerge further from the following description with reference to the appended drawing given by way of nonlimiting example.

DETAILED DESCRIPTION OF THE INVENTION

Referring to the appended drawing, the culinary vessel such as a frying pan is made from two sheets 1, 2 of different metals or alloys laminated together and pressed to form a vessel having a bottom 3 and a side wall 4.

Figure 2:
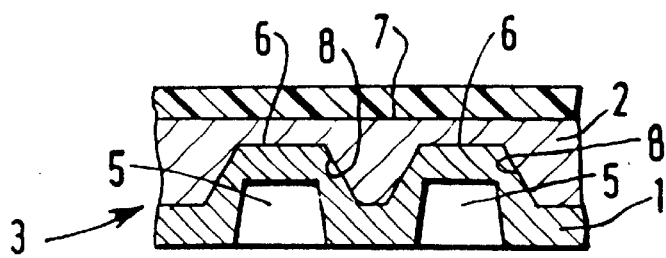
FIG. 2 is a view to a larger scale of the detail A from FIG. 1.

In accordance with the invention, the bottom 3 includes small cavities 5 formed by cold stamping so that the cavities 5 formed in the outer sheet 1 enter complementary cavities 6 formed in the inner sheet 2 (see FIG. 2).

Figure 1:
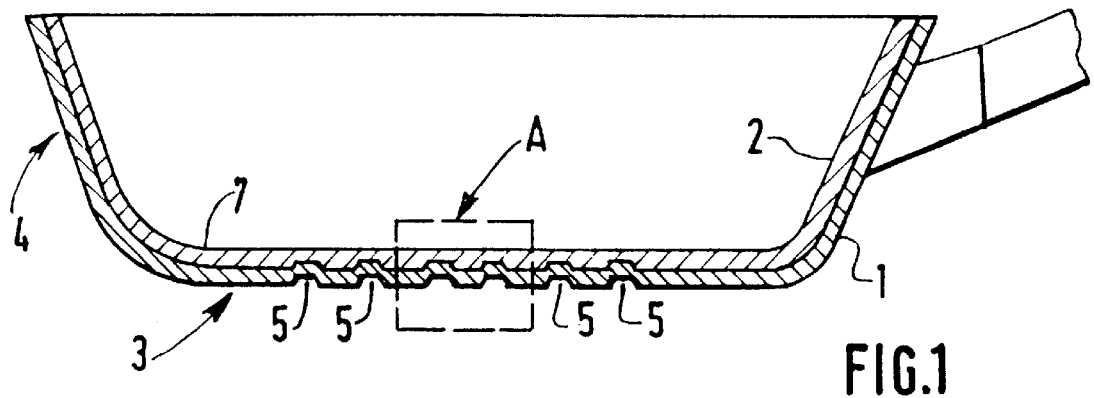
FIG. 1 is a diametral sectional view of a culinary vessel in accordance with the invention.

In the embodiment of the invention shown in FIGS. 1 and 2 the inner sheet 2 is thicker than the outer sheet 1.

The inner sheet 2 is preferably a sheet of a metal or an alloy that is softer than that of the outer sheet 1.

For example, the inner sheet 2 is a sheet of aluminum and the outer sheet 1 is a sheet of stainless steel.

In the example shown the inner surface 7 of the bottom 3 of the inner sheet 2 is substantially flat and smooth and its outer surface in contact with the sheet 1 includes cavities 6 in which engage complementary protuberances 8 formed when cavities 5 are stamped into the outer sheet 1.

Figure 3:
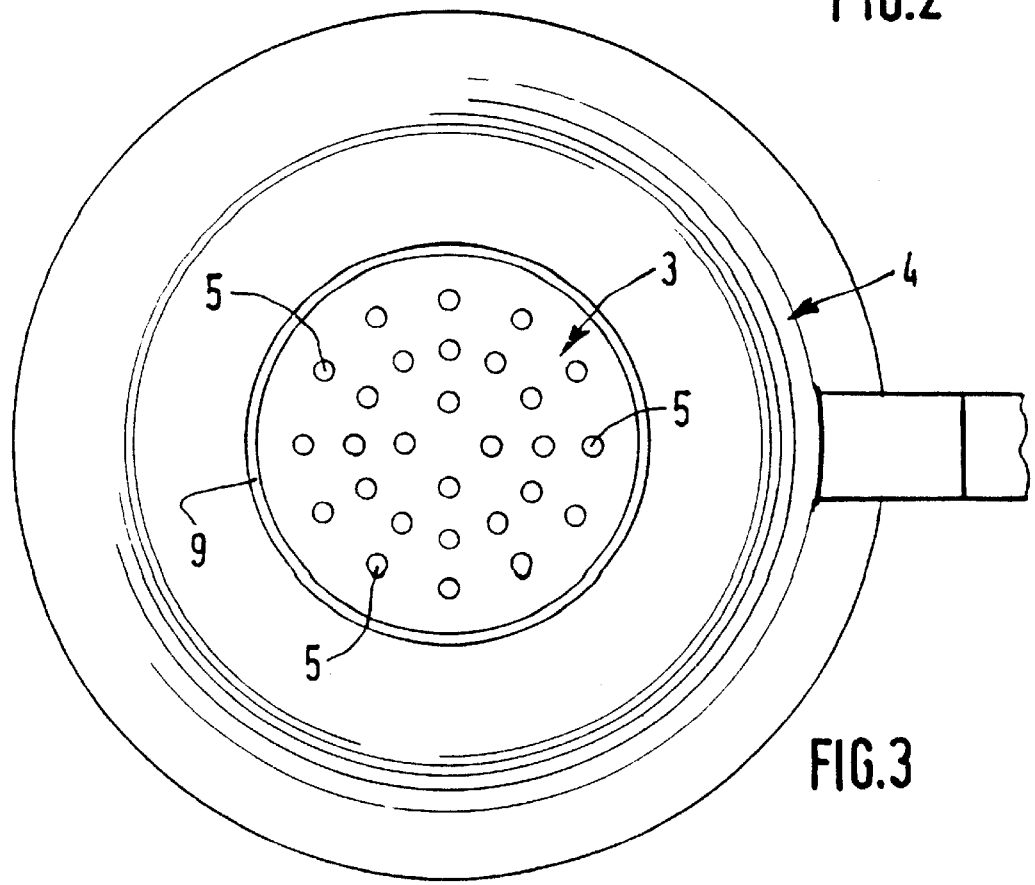
FIG. 3 is a bottom view of the vessel shown in FIG. 1.

As can be seen in FIGS. 1 and 3, the cavities 5 formed by cold stamping are in a central area of the bottom 3 of the vessel.

The stamped cavities 5 have a substantially cylindrical or frustoconical shape.

The bottom 3 can also include one or more stamped cavities 9 having an annular shape and/or stamped cavities in the shape of letters, digits or other symbols.

To manufacture a culinary vessel in accordance with the invention a disk comprising sheets 1, 2 of different metals or alloys laminated together is stamped.

In accordance with the invention, small cavities 5 are formed by cold stamping in the area of the disk corresponding to the outside of the bottom 3 of the finished vessel. These cavities are sufficiently deep for complementary cavities to be formed in the inner sheet 2, in which the protuberances 6 stamped into the outer sheet 1 engage. The disk is then pressed to form the vessel.

The interpenetration of the cavities in the sheets 1 and 2 provides further mechanical bonding between them in the area of the bottom of the vessel, which strengthens the bond obtained by laminating the sheets 1 and 2.

This prevents any risk of "unsticking" of the laminated sheets due to the effect of repetitive heating and cooling of the cooking vessel.

The strengthened mechanical bond between the two sheets of different metals obtained in accordance with the invention increases the resistance to deformation of the bottom of the vessel.

Of course, the invention is not limited to the example just described and many modifications can be made thereto without departing from the scope of the invention.

There is claimed:

1. Method of manufacturing a culinary vessel from a disk made of two sheets of different metals or alloys laminated together and pressed to form a bottom and a side wall, both inner and outer sheets being in direct contact with one another over their entire surface, the method comprising: cold stamping said disk in the area corresponding to the outside bottom of said vessel to form small cavities which are sufficiently deep to form protuberances on the outer sheet in said area and to create complementary cavities in the inner sheet in which engage the protuberances stamped into the outer sheet; and thereafter pressing said disk to form said vessel.

2. Method according to claim 1, wherein said inner sheet is thicker than said outer sheet.

3. A method according to claim 2, wherein said inner sheet is a sheet of a metal or an alloy that is softer than that of said outer sheet.

4. Method according to claim 3, wherein said inner sheet is an aluminum sheet and said outer sheet is a stainless steel sheet.

5. Method according to claim 1, wherein said stamped cavities are in a central area of said bottom of said vessel.

6. Method according to claim 1, wherein said stamped cavities are substantially cylindrical.

7. Method according to claim 1, wherein said stamped cavities are annular.

8. Method according to claim 1, wherein said stamped cavities are in the shape of letters, digits or other symbols.

* * * * *